United States Patent [19]

Lane et al.

[11] Patent Number: 5,028,267

[45] Date of Patent: Jul. 2, 1991

[54] AQUEOUS DISPERSION OF MICROSILICA HAVING A DELAYED THIXOTROPIC REACTION

[75] Inventors: Donald R. Lane, Richfield; Jose A. Melendez, Bedford, both of Ohio

[73] Assignee: Axim Concrete Technologies, Inc., Walton Hills, Ohio

[21] Appl. No.: 518,294

[22] Filed: May 3, 1990

Related U.S. Application Data

[63] Continuation of Ser. No. 289,211, Dec. 23, 1988, abandoned, which is a continuation-in-part of Ser. No. 179,977, Apr. 11, 1988, abandoned.

[51] Int. Cl.$^5$ .................................................. C07G 1/00
[52] U.S. Cl. .............................. 106/287.1; 106/186; 106/287.34; 106/481
[58] Field of Search ................ 106/186, 287.1, 287.34, 106/481

[56] References Cited

U.S. PATENT DOCUMENTS

| | | | |
|---|---|---|---|
| 2,383,653 | 8/1945 | Kirk | 252/412 |
| 3,855,145 | 12/1974 | Vossos | 106/287.34 |
| 4,418,111 | 11/1983 | Carstens | 106/287.34 |
| 4,429,066 | 1/1984 | Gilmer | 106/287.34 |
| 4,452,723 | 6/1984 | Carstens | 106/287.34 |
| 4,626,289 | 12/1986 | Hsu | 106/287.34 |
| 4,631,086 | 12/1986 | Jones | 106/36 |
| 4,737,525 | 4/1988 | Blount | 106/287.34 |

OTHER PUBLICATIONS

Hach's Chemical Dictionary, 4th ed., McGraw-Hill p. 702.

*Primary Examiner*—William R. Dixon, Jr.
*Assistant Examiner*—Willie J. Thompson
*Attorney, Agent, or Firm*—James A. Hudak

[57] ABSTRACT

The thixotropic reaction that takes place in an aqueous dispersion of micro silica is delayed by the addition of a pre-determined amount of at least one chemical additive selected from the group consisting of amides, such as carbamide, or polyols, such as glycerol and propylene glycol.

10 Claims, No Drawings

AQUEOUS DISPERSION OF MICROSILICA HAVING A DELAYED THIXOTROPIC REACTION

This is a continuation of co-pending application Ser. No. 07/289,211 filed on Dec. 23, 1988, now abandoned, which is a continuation-in-part of copending application Ser. No. 07/179,977 filed on Apr. 11, 1988, now abandoned.

TECHNICAL FIELD

The present invention relates generally to thixotropic reactions and more particularly to the addition of at least one chemical additive to an aqueous dispersion of micro silica to delay the thixotropic reaction which occurs therein.

BACKGROUND ART

Fumed silica can be manufactured by a process involving reacting evaporated silicon tetrachloride in an oxygen-hydrogen flame to produce silicon dioxide and hydrochloric acid. The resulting product is 99.8% pure silica, its particles are non-porous, extremely small in diameter (average 12 millimicrons), have a defined shape, and are loosely agglomerated. The surface of the particles contain siloxane and silanol groups. In terms of numbers, the siloxane groups within the resulting product predominate causing the product to have a fully inert character. The silanol groups within the resulting product impart hydrophilic properties. However, with compounds that are especially reactive, such as organosilanes, chemical reactions with the silanol groups may be carried out, thus imparting hydrophobic properties. Areas of application for the resulting product include paints and inks, and use as a suspension and/or and anti-blocking agent.

The manufacture of precipitated silica begins with the reaction of an alkaline silicate solution, usually sodium silicate (waterglass), with a mineral acid. The resultant white precipitate is pumped through filter presses which yield cakes with higher solids content than could be obtained through other filtration means. Salts that are formed during the precipitation process are washed out in the filtering equipment. The resulting solid content of the filtered cakes is generally in the range of 15 to 20%. Drying is carried out through turbine, rotary, or spray drying. Since 80 to 85% of the water must be driven off during the drying process, this process is cost intensive. Milling can generally be done after drying to reduce the size of agglomerates formed during the drying process. After milling has been completed, sizing classification separates the product from grit and other impurities. Purity of the resulting product is in the range of 98–100% silica. Areas of application for precipitated silica include use as an agent for any of the following functions: anti-blocking, anti-slip, defoaming, insulation, thickening, polishing, carrier (liquids to powders), filler for inks, clarifier for liquid systems, etc.

The resulting products produced by both of the foregoing processes have a BET surface area in excess of 100 $m^2/g$ and a tamped density of approximately 100 g/l. In addition, both of these products have a tendency to gel when in a colloidal dispersion. In order to prevent, to a certain degree, the gelling behavior of a colloidal dispersion of precipitated silica, it has been proposed (Society of Petroleum Engineers Journal, July, 1969, page 42) that precipitated silica be reacted with dimethyldichlorosilane. The precipitated silica produced by this reaction is more expensive because of the additional production step required.

Micro silica is produced as a by-product in the manufacture of ferrosilicon or silicon metals through the use of electric arc furnaces. This by-product material contains high amounts of extremely fine spherical particles of silicon dioxide. The micro silica is captured from the escaping gases of the arc furnaces by means of electrostatic precipitators The collected material generally contains more than 75 percent silicon dioxide. Other constituents are carbon, sulfur, and the oxides of iron, aluminum, calcium, magnesium, sodium and potassium. The chemical composition of this by-product varies depending upon the type of metal or alloy being produced For example, the micro silica produced from a furnace being used to manufacture ferrosilicon metal will generally contain more iron and magnesium oxide than from a furnace being used to manufacture silicon metal. Regardless of the type of charge within the furnace, the micro silica produced as a by-product typically has a BET surface area of approximately 20 $m^2/g$, a bulk density of approximately 200 g/l and a tamped density of approximately 600 g/l.

It has been found that the addition of micro silica to fresh concrete affects the pore size distribution and the hydration products formed during hydration, and thereby increases the strength and durability of the resulting concrete product. The properties of micro silica and its use as an additive to cement, concrete and mortar have been thoroughly discussed in a technical paper entitled "Silica Fume" by V. M. Malhotra and G. G. Garette in the May, 1982 issue of *Concrete Construction*, pages 443 to 446. The technical information contained in the foregoing paper is incorporated by reference in the description of the present invention.

Since micro silica consists of very fine vitreous particles, most of which are smaller than one micron, it has been noted by the aforementioned authors that the use of this product presents handling problems and may pose a health hazard. These problems can be overcome by transporting and using micro silica in the form of an aqueous dispersion consisting, in general, of approximately 50% by weight of water, and the balance being micro silica. A problem, however, arises with the use of such aqueous dispersions of micro silica due to the fact that such dispersions have an affinity to become thixotropic.

The affinity to thixotropy may be desirable in certain applications. For example, this property is desirable and necessary in order to produce the coating of fumed silica or precipitated silica which is placed on cardboard to reduce warpage and to maintain the non-skid properties of same. In the concrete industry, however, the affinity of such dispersions to become thixotropic is undesirable and there has been considerable research with respect to techniques for delaying the thixotropic reaction which occurs in such dispersions.

SUMMARY OF THE INVENTION

The present invention solves the problems associated with the prior art as well as other problems by providing an aqueous dispersion of micro silica which has a delayed affinity to becoming thixotropic. This delayed affinity results from adding to the aqueous dispersion a predetermined amount of at least one chemical additive selected from the group consisting of amides and polyols. These chemical additives have the ability to modify the rheology of the thixotropic reaction by breaking the physical bonding between the interstices of the submicroscopic crystalline particles of micro silica. The results obtained by the present invention indicate that an aqueous dispersion of micro silica to which is added a pre-determined amount of at least one of the foregoing additives substantially delays the gelling of same.

DESCRIPTION OF THE PREFERRED EMBODIMENTS

According to a preferred embodiment of the present invention, the addition of at least one chemical additive selected from the group consisting of amides and polyols to an aqueous dispersion of micro silica containing from 40 to 55% by weight of micro silica and from 1 to 5% by weight of the additive, the remainder being water, results in the aqueous dispersion having a delayed affinity to becoming thixotropic. The micro silica utilized is produced as a byproduct in the manufacture of ferrosilicon or silicon metals through electric arc furnaces and is typically comprised of extremely fine, amorphous silica particles having a surface area of approximately 20 $m^2/g$ and a tamped density of approximately 600 g/l. The pH of the resulting dispersion is 7.

The amides which can be added to the aqueous dispersion of micro silica must have a solubility coefficient in water sufficient to be completely dissolved or mixed in the aqueous dispersion. Examples of amides which may be used include carbamide, biuret, formamide, acetamide, and carbamic acid, with carbamide being preferred. In particular, it has been found that 1 to 2% carbamide in a 50% aqueous dispersion of micro silica effectively delays the aqueous dispersion from becoming thixotropic and allows for much easier handling of same in industrial situations. In effect, the thixotropic reaction is delayed and a liquid phase is maintained for a considerable number of days.

The polyols which can be added to the aqueous dispersion of micro silica must also be completely soluble or mixable in this solution. Polyols which can be used include diols and triols, such as ethylene glycol, propylene glycol, butylene glycol, and glycerol, with glycerol and propylene glycol being preferred. The invention will be described further in conjunction with the following examples which are not intended to limit the invention described herein. These examples illustrate test results at different temperatures of aqueous dispersions of micro silica (50% solids) with and without various additives thereto.

EXAMPLE I

| 38° F. | Plain | Carbamide-2% | Propylene Glycol-5% | Glycerine 5% |
|---|---|---|---|---|
| Time interval before gel occurred | 18 hrs. | 14 days (very fluid) 18 days (very fluid) 21 days (very little signs of setting or gelling) 28 days (gelled- but very soft gel) | 5 days | 6 days |

EXAMPLE II

| 72° F. | Plain | Carbamide-2% | Propylene Glycol-5% | Glycerine 5% |
|---|---|---|---|---|
| Time interval before gel occurred | 12 hrs. | 11 days (slight increase in viscosity) 14 days (maintained same viscosity) 18 days (approx. ¼ has begun to gel- soft gel) 21 days (approx. ¾ has begun to gel- soft gel) 25 days (gelled-soft gel- no lumps) | 24 hrs. | 36 hrs. |

EXAMPLE III

| 102° F. | Plain | Carbamide-2% | Propylene Glycol-5% | Glycerine 5% |
|---|---|---|---|---|
| Time interval before gel occurred | 12 hrs. | 9 days (slight increase in viscosity) 12 days (approx. ½ gelled but very soft gel- no lumps) 14 days (approx. ¾ gelled still soft gel- no lumps) 18 days (gelled-but very soft gel-no lumps) | 2 days | 2 days |

The results shown in Examples I, II and III are of particular interest since they illustrate that a thixotropic reaction can be delayed with the addition of the proper additive to the aqueous dispersion of micro silica. The addition of the proper additive delays the thixotropic reaction that takes place when no additive is used.

While the invention has been described with reference to certain preferred embodiments, those skilled in the art will appreciate that various modifications and substitutions can be made without departing from the spirit of the invention. In particular, the aqueous dispersion of micro silica with proper additives may have added thereto small amounts of compatible chelating agents containing alkaline earth cations, such as magnesium or calcium, which normally occur in ordinary water and would also tend to precipitate surface active agents, without substantially affecting the delaying of the thixotropic reaction. Furthermore, small amounts of compatible cosmetic coloring agents or the like may be added to the aqueous dispersion without any significant effect.

Certain modifications and improvements will occur to those skilled in the art upon reading the foregoing. It should be understood that all such modifications and improvements have been deleted herein for the sake of conciseness and readability, but are properly with the scope of the following claims.

We claim:

1. An aqueous dispersion of micro silica having a delayed affinity to becoming thixotropic comprising a mixture of about 40 to 55 percent by weight of micro "silica", said micro silica being a by-product in the production of another material, 1 to 5 percent by weight of at least one additive selected from the group comprising "amides" and "polyols", and the remainder being "water".

2. The aqueous dispersion as defined in claim 1 wherein said additive is carbamide.

3. The aqueous dispersion as defined in claim 1 wherein the amount of said micro silica in said mixture is about 50% by weight, and the amount of said additive is about 1 to 2% by weight and is selected from the group comprising amides.

4. The aqueous dispersion as defined in claim 1 wherein the amount of said micro silica in said mixture is about 50% by weight, and the amount of said additive is about 5% by weight and is selected from the group comprising polyols.

5. The aqueous dispersion as defined in claim 1 wherein said micro silica has a BET surface area of about 20 $m^2/g$.

6. The aqueous dispersion as defined in claim 1 wherein said micro silica has a tamped density of about 600 g/l.

7. An aqueous dispersion of micro silica having a delayed affinity to becoming thixotropic comprising a mixture of about 40 to 55% by weight of micro silica, 1 to 5% by weight of at least one additive selected from the group comprising amides and polyols, said "additive being glycerol", and the remainder being water.

8. The aqueous dispersion of micro silica having a delayed affinity to becoming thixotropic comprising a mixture of about 40 to 55% by weight of micro silica, 1 to 5% by weight of at least one additive selected from the group comprising amides and polyols, said additive being propylene glycol, and the remainder being water.

9. The aqueous dispersion as defined in claim 1 wherein said micro silica has a pH of about 7.

10. The aqueous dispersion as defined in claim 1 wherein said aqueous dispersion has a pH of about 7.

* * * * *